S. HARA.
AUTOMOBILE BAGGAGE HOLDER.
APPLICATION FILED MAY 8, 1917.
1,246,591.
Patented Nov. 13, 1917.
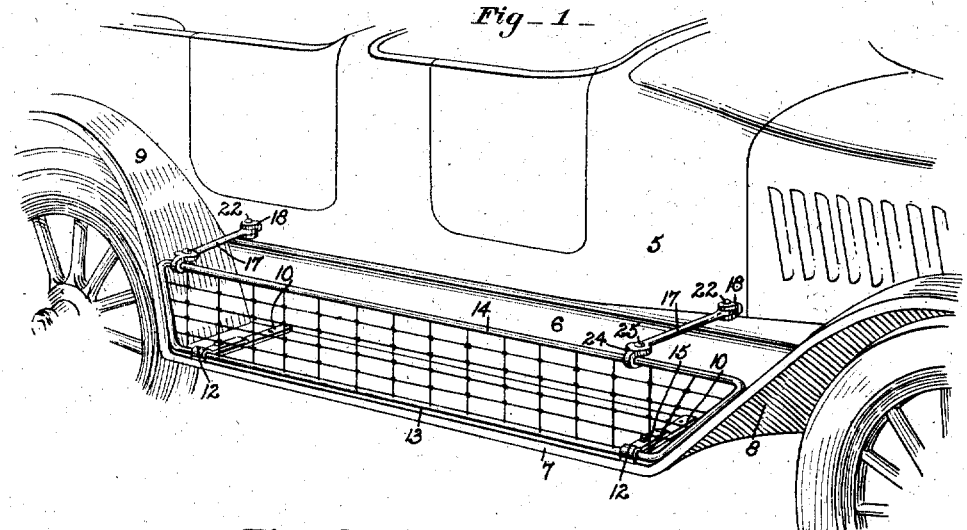
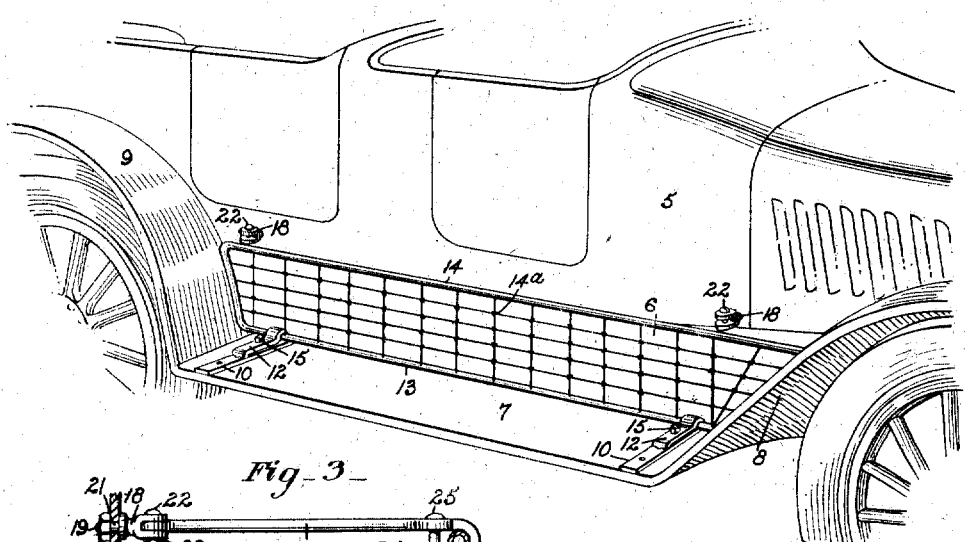
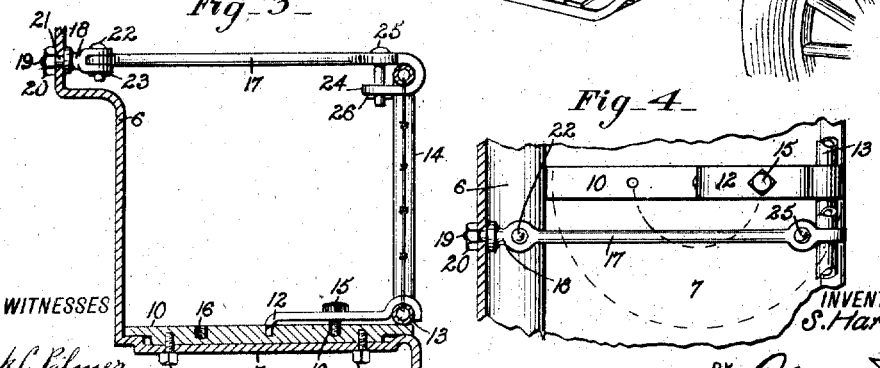
WITNESSES
Frank C. Palmer.
E. B. Marshall
INVENTOR
S. Hara
BY
ATTORNEYS

UNITED STATES PATENT OFFICE.

SHIBATARO HARA, OF MUZQUIZ, MEXICO.

AUTOMOBILE BAGGAGE-HOLDER.

1,246,591.  Specification of Letters Patent.  Patented Nov. 13, 1917.

Application filed May 8, 1917. Serial No. 167,357.

*To all whom it may concern:*

Be it known that I, SHIBATARO HARA, a citizen of the Empire of Japan, and a resident of Muzquiz, in the State of Coahuila, Mexico, have invented a new and Improved Automobile Baggage-Holder, of which the following is a full, clear, and exact description.

My invention has for its object to provide an automobile baggage holder consisting of a frame adapted to be disposed vertically of the foot-board between the front and rear fenders, means being provided for supporting the frame either at the outer side of the foot-board, forming with the fenders and the shield a receptacle, or out of the way at the inner side of the foot-board.

Additional objects of the invention will appear in the following specification, in which the preferred form of the invention is disclosed.

In the drawings, similar reference characters denote similar parts in all the views, in which—

Figure 1 is a perspective view showing the side of an automobile provided with my baggage holder;

Fig. 2 is a view similar to that illustrated in Fig. 1, but with the frame secured close against the automobile shield;

Fig. 3 is a transverse sectional view of a shield, and a foot-board provided with my baggage holder; and Fig. 4 is a sectional fragmentary plan view of Fig. 3.

By referring to the drawings, it will be seen that the automobile 5 has a shield 6, a foot-board 7, a front fender 8, and a rear fender 9, and that two plates 10 are disposed transversely of the foot-board 7 and are secured thereto by means of screws 11. A clamp 12 is pivoted to the central portion of each of these plates 10, these clamps 12 being adapted to be disposed outwardly or inwardly, to grip the bottom 13 of a frame 14 either at the outer side of the foot-board as illustrated in Fig. 1, or at the inner side of the foot-board as illustrated in Fig. 2 of the drawings. The clamps 12 are secured in adjusted position by means of screws 15 which are disposed through orifices in the clamps 12 and mesh in threaded orifices 16 in the plates 10.

When the frame 14 is disposed at the outer side of the foot-board 7, the top of the frame is held spaced from the shield 6 by means of rods 17 which are articulated to brackets 18, which in turn are secured to the shield 6 by means of bolts 19 and nuts 20, the bolts 19 being disposed through orifices 21 in the shield. The rods 17 are articulated to the brackets 18 by means of studs 22 which are held in place by cotter pins 23, it being possible to remove these cotter pins, after which the studs 22 may be raised to permit the removal of the rods 17. The outer ends of the rods 17 have hooks 24, which are normally disposed around the top of the frame 14, studs 25 being disposed in orifices in the rods 17 and in the hooks 24, the said studs 25 being held in place by means of cotter pins 26 disposed below the hooks 24. When the frame 14 is secured close to the shield 6, as illustrated in Fig. 2 of the drawings, the rods 17 are preferably removed, and are placed in the automobile tool box.

The frame 14 is preferably an open one, filled in with wire mesh 14ª.

Having thus described my invention, I claim as new and desire to secure by Letters Patent:

1. In an automobile baggage holder, a frame, two plates adapted to be disposed transversely of the foot-board and be secured thereto, and two clamps one mounted on each plate and adapted to grip the bottom of the frame in any one of a plurality of positions relatively to the plates.

2. In an automobile baggage holder, a frame, two plates adapted to be disposed transversely of the foot-board and be secured thereto, two clamps one mounted on each plate and adapted to grip the bottom of the frame in any one of a plurality of positions relatively to the plates, and rods adapted to be secured to the automobile shield and to the upper portion of the frame.

3. In an automobile baggage holder, a frame, two plates adapted to be disposed transversely of the foot-board and be secured thereto, two clamps one pivoted adjacent the center of each plate and adapted to grip the bottom of the frame at the outer or at the inner ends of the plates, and means to secure the clamps in adjusted positions.

SHIBATARO HARA.